US009507336B2

(12) United States Patent
Tandon et al.

(10) Patent No.: US 9,507,336 B2
(45) Date of Patent: Nov. 29, 2016

(54) APPARATUS AND METHOD FOR DETERMINING AN AGGREGATE CONTROL CONNECTION STATUS OF A FIELD DEVICE IN A PROCESS CONTROL SYSTEM

(71) Applicant: Honeywell International, Inc., Morristown, NJ (US)

(72) Inventors: Vibhor Tandon, Bangalore (IN); Ritwik Ganguly, Bangalore (IN); Falgun Bhayani, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 614 days.

(21) Appl. No.: 13/748,863

(22) Filed: Jan. 24, 2013

(65) Prior Publication Data

US 2014/0207255 A1   Jul. 24, 2014

(51) Int. Cl.
*G06F 19/00* (2011.01)
*G05B 19/042* (2006.01)

(52) U.S. Cl.
CPC . *G05B 19/0428* (2013.01); *G05B 2219/24001* (2013.01); *G05B 2219/25428* (2013.01)

(58) Field of Classification Search
CPC ........... G06F 17/5022; G06F 17/5009; G06F 11/3457; G01R 31/318357; G05B 13/024; G05B 19/0428; G05B 2219/24036; G05B 2219/32201; G05B 23/0256

See application file for complete search history.

(56) References Cited

U.S. PATENT DOCUMENTS

| 8,548,777 | B2* | 10/2013 | Sturrock et al. ................. 703/6 |
| 2004/0078182 | A1* | 4/2004 | Nixon et al. .................... 703/22 |
| 2007/0094229 | A1* | 4/2007 | Crandall et al. ................ 706/60 |
| 2007/0208549 | A1* | 9/2007 | Blevins et al. ................... 703/6 |
| 2008/0066004 | A1* | 3/2008 | Blevins et al. ............... 715/771 |
| 2008/0125884 | A1* | 5/2008 | Schumacher et al. .......... 700/79 |
| 2010/0168874 | A1* | 7/2010 | Lucas et al. .................... 700/17 |
| 2012/0041570 | A1* | 2/2012 | Jones et al. .................... 700/17 |
| 2012/0173688 | A1* | 7/2012 | True et al. .................... 709/223 |
| 2013/0147630 | A1* | 6/2013 | Nakaya et al. ............ 340/691.6 |
| 2013/0219156 | A1* | 8/2013 | Sears ............................. 713/1 |

* cited by examiner

*Primary Examiner* — Darrin Dunn

(57) ABSTRACT

A method includes identifying a plurality of elements in a process control system that uses a process value from a field device. The method also includes identifying an aggregate control connection status of the field device by (i) determining whether one or more of the elements can use a manual value in place of the process value, (ii) determining whether one or more other elements in the plurality can use a user configured value, and (iii) evaluating a logic expression based on results of the determining in (i) and (ii). The method further includes determining whether the field device is available to be taken offline based on the aggregate control connection status. In addition, the method includes generating a notification based on the determination of whether the field device is available to be taken offline.

20 Claims, 3 Drawing Sheets

APPARATUS AND METHOD FOR DETERMINING AN AGGREGATE CONTROL CONNECTION STATUS OF A FIELD DEVICE IN A PROCESS CONTROL SYSTEM

TECHNICAL FIELD

This disclosure relates generally to industrial process control systems. More specifically, this disclosure relates to an apparatus and method for determining an aggregate control connection status of a field device in industrial process control systems.

BACKGROUND

Industrial plants are often managed using process control systems. Example industrial plants include processing facilities, manufacturing plants, chemical plants, crude oil refineries, and ore processing plants. Among other operations, process control systems typically manage the use of smart instruments, for example transmitters, motors, valves, pumps, and other actuators or industrial equipment in the processing facilities.

In industrial plants, plant operators usually send a request to have a field device checked if the operators notice any malfunction in the process values transmitted by the field device or suspect a problem with the field device. Before starting any maintenance activities, maintenance engineers generally ask the operators to take the necessary actions to safeguard the process operation where the device is used in the process control system. This is to avoid a sudden disruption in the operation of the process control system, which may occur once the field device is taken out for maintenance. The process control system will no longer receive or send live process values to or from the field device when the field device is taken offline. This sudden unavailability of the live process values may cause unwanted disturbances in a portion of the process control system.

Many industrial process control systems provide an option for operators to manually simulate a process value to safeguard against unwanted disturbances when a field device is taken offline for maintenance. The simulated process value from the field device could be used in multiple connections in the overall process control system. However, in many industrial plants, the identification of such connections is purely manual and is therefore prone to human error. Additionally, when physically taking the field device offline, a field technician needs to be able to correctly and reliably identify the correct field device. The manual aspects of identification and decision-making in taking a field device offline for maintenance can have various disadvantages, including disturbances in plant processes, as well as plant safety or productivity issues.

SUMMARY

This disclosure provides an apparatus and method for determining an aggregate control connection status of a field device in a process control system.

In a first embodiment, a method includes identifying a plurality of elements in a process control system that uses a process value from a field device. The method also includes identifying an aggregate control connection status of the field device by (i) determining whether one or more of the elements can use a manual value in place of the process value, (ii) determining whether one or more other elements in the plurality can use a user configured value, and (iii) evaluating a logic expression based on results of the determining in (i) and (ii). The method further includes determining whether the field device is available to be taken offline based on the aggregate control connection status. In addition, the method includes generating a notification based on the determination of whether the field device is available to be taken offline.

In a second embodiment, an apparatus includes at least one memory configured to store information identifying a plurality of elements in a process control system that uses a process value from a field device. The apparatus also includes at least one processing device configured to identify the plurality of elements. The at least one processing device is also configured to identify an aggregate control connection status of the field device by (i) determining whether one or more of the elements can use a manual value in place of the process value, (ii) determining whether one or more other elements in the plurality can use a user configured value, and (iii) evaluating a logic expression based on results of the determining in (i) and (ii). The at least one processing device is further configured to determine whether the field device is available to be taken offline based on the aggregate control connection status. In addition, the at least one processing device is configured to generate a notification based on the determination of whether the field device is available to be taken offline.

In a third embodiment, a non-transitory computer readable medium embodies a computer program. The computer program includes computer readable program code for identifying a plurality of elements in a process control system that uses a process value from a field device. The computer program also includes computer readable program code for identifying an aggregate control connection status of the field device by (i) determining whether one or more of the elements can use a manual value in place of the process value, (ii) determining whether one or more other elements in the plurality can use a user configured value, and (iii) evaluating a logic expression based on results of the determining in (i) and (ii). The computer program further includes computer readable program code for determining whether the field device is available to be taken offline based on the aggregate control connection status. In addition, the computer program includes computer readable program code for generating a notification based on the determination of whether the field device is available to be taken offline.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
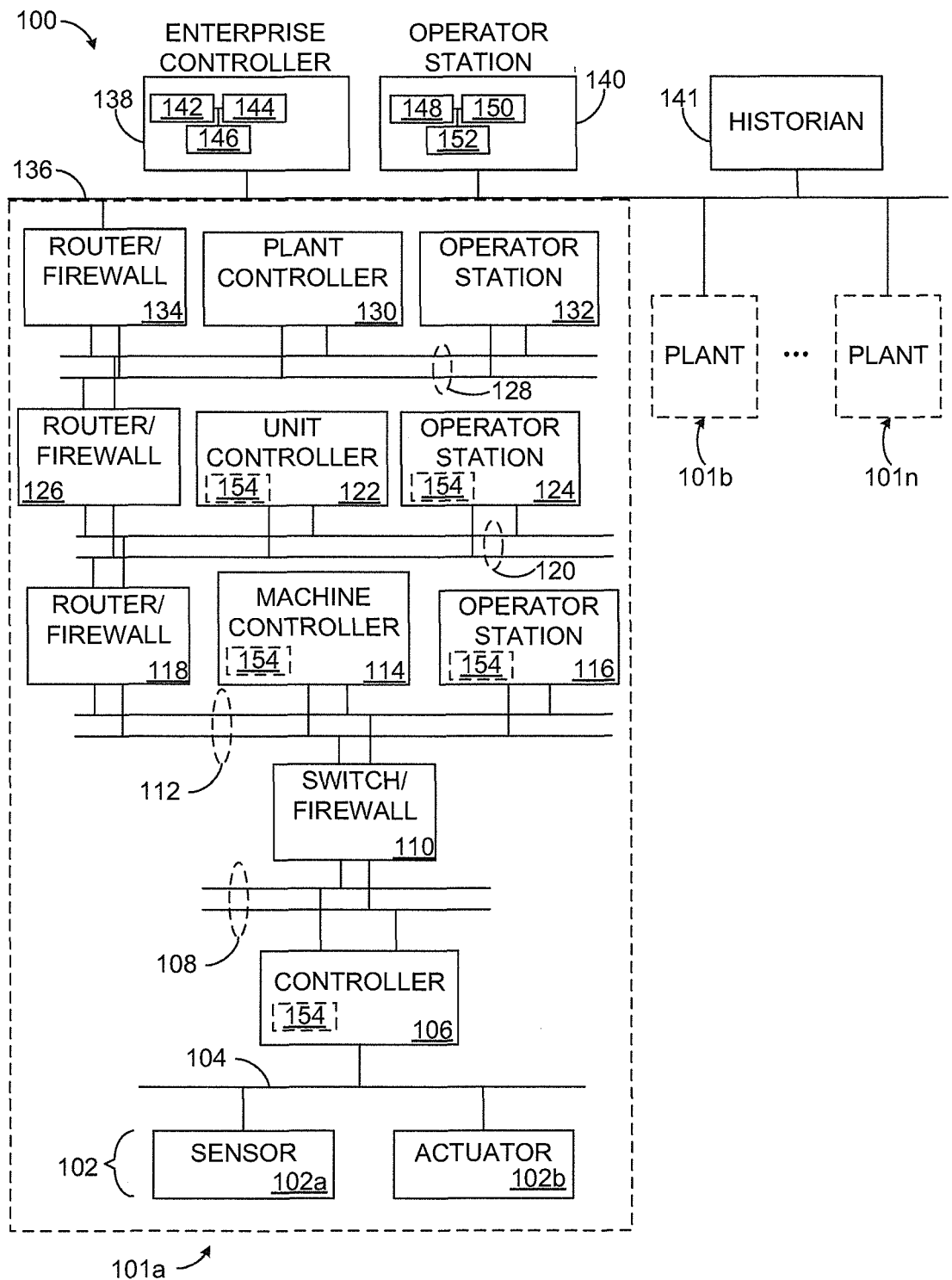
FIG. 1 illustrates an example industrial process control system according to this disclosure.

FIG. 1 illustrates an example industrial process control system 100 according to this disclosure. As shown in FIG. 1, the process control system 100 includes various components that facilitate production or processing of at least one product or other material. For instance, the process control system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the process control system 100 is implemented using the Purdue model of process control. In the Purdue model, "Level 0" may include field devices 102 such as one or more sensors 102a and one or more actuators 102b. The sensors 102a and actuators 102b represent components in a process system that may perform any of a wide variety of functions. For example, the sensors 102a could measure and/or transmit a wide variety of characteristics in the process system, such as temperature, pressure, or flow rate. Also, the actuators 102b, such as heaters, motors, switches, or valves, could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. In another example, a controller 106 could identify a status of connections to and from one of the field devices 102 to determine whether the field device 102 can be taken offline for maintenance or other purposes. Each controller 106 includes any suitable structure for interacting with one or more sensors 102a and controlling one or more actuators 102b. As a particular example, each controller 106 could represent a computing device running a MICROSOFT WINDOWS operating system. In another example, each controller 160 could run an embedded real-time Operating System. The term "offline" generally refers to a condition where a field device does not provide a process value, regardless of how the field device gets to that condition (power down, physical disconnection, etc.).

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. In another example, the machine-level controller 114 could identify a status of connections to and from one of the field devices 102 to determine whether the field device 102 can be taken offline for maintenance. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server-computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. In another example, the operator stations 116 could allow users to review the status of connections to and from field devices 102 to determine maintenance availability. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server-computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server-computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server-computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the process control system 100. The historian 141 could, for example, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces.

In one aspect of operation, at least one component of the system 100 implements or otherwise provides a framework 154 to find interdependencies of a field device and illustrate the same to a user so that all control connections can be reliably identified. This provides the ability to calculate an aggregate control connection status by treating each control connection as a logical element to deduce the aggregate control connection status based on default safe values for declaring the availability of the field device for maintenance. Various embodiments also provide configurability options to override and/or modify identified logic points to deduce the aggregate control connection status. This provides flexibility for the user to adapt the solution to specific needs of specific field applications. Various embodiments perform the above calculations either continuously in the background or on demand. Among other things, this helps to reduce or eliminate the risks associated with manual aspects on both system and field sides for safe and reliable decision-making during device maintenance.

Additional details regarding the determination of an aggregate control connection status for a field device are provided below. The framework 154 includes any suitable structure for identifying an aggregate control connection status for at least one field device. The framework 154 could, for example, be implemented using hardware or using a combination of hardware and software/firmware. The framework 154 could be implemented as a standalone device or as part of another device, such as a controller, server, or operator station.

Although FIG. 1 illustrates one example of an industrial process control system 100, various changes may be made to FIG. 1. For example, a control system could include any number of sensors, actuators, controllers, servers, operator stations, and networks. Also, the makeup and arrangement of the process control system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which the determination of an aggregate control connection status for a field device can be used. This functionality can be used in any other suitable device or system.

Figure 2:
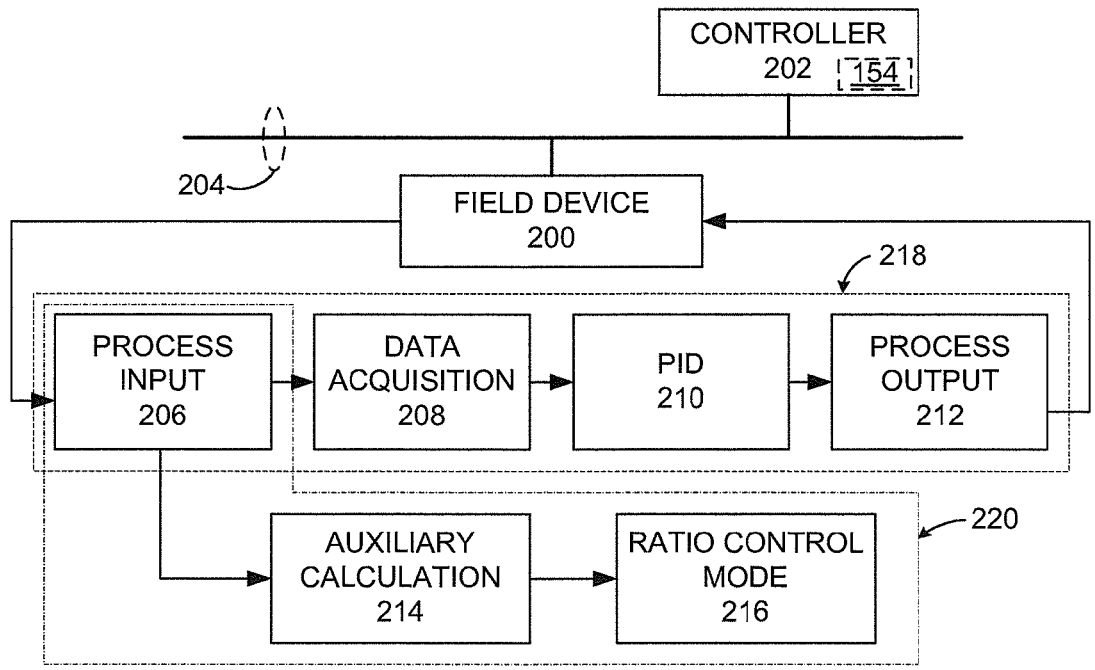
FIG. 2 illustrates an example field device in an industrial process control system according to this disclosure.

FIG. 2 illustrates an example field device 200 in an industrial process control system according to this disclosure. The field device 200 could, for example, represent one of the field devices 102 in the process control system 100 of FIG. 1. For example, without limitation, the field device 200 may be a sensor, transmitter, actuator, valve, receiver, and/or other type of field device.

The field device 200 is controlled by a controller 202. The controller 202 is connected to the field device 200 by a network 204. The controller 202 may be located at any of the different levels of the process control system 100. As a particular example, the network 204 may be a field level network, such as the network 108 in FIG. 1 or any of the higher-level networks.

In some embodiments, the field device 200 may be used to form closed-loop and/or open-loop control connections to one or more processes in the industrial process control system 100 based on the operation of the industrial plant. As a result, one or multiple process values of the field device 200 may be used by one or multiple other components in the industrial process control system 100. For example, these other elements may use a process value from the field device 200 for safety or critical applications, advanced process control, and supervisory applications. The other elements in the system 100 that use the process value(s) of the field device 200 may include, for example, other field devices, controllers, process control applications that control aspects of other components in the system 100, or reporting applications.

FIG. 2 illustrates one example of this. In the example illustrated, a process value from the field device 200 is provided as a process input 206. The process input 206 is provided to a data acquisition element 208 and then to a proportional, integration, and derivative (PID) element 210. The PID element 210 generates a process output 212 to form a closed-loop control connection. The process input 206 is also provided to an auxiliary calculation element 214, which provides data to a ratio control mode element 216 to form another control connection.

In this illustrative example, each component 206-216 may be implemented using only hardware or a combination of hardware and software/firmware. For example, the data acquisition element 208 may represent an application that acquires data for reporting or inclusion in a calculation in the closed-loop flow control. The PID element 210 may represent an application that uses the process value from the field device 200 in an algorithm in the closed-loop control. The auxiliary calculation element 214 may represent an application that uses the process value with some auxiliary calculations, and the ratio control mode element 216 may represent an application that uses the process value in ratio control. When ratio control is applied, one process input (the dependent input) is proportioned to another process input (the independent input). The independent input may be a process measurement (such as the process value) or a setpoint. The proportion that is to be maintained between the inputs is known as the ratio. For example, a ratio of 1:2 would specify that the two inputs are to be maintained in the same proportion. As the value of the independent input changes, the other process input is changed through ratio control to maintain the proportion of the inputs specified by the ratio setpoint. In nearly all ratio control applications, the ratio controller (the ratio control mode element 216) sets the setpoint.

If the field device 200 supplying the process value(s) via the process input 206 is taken offline, the closed-loop and open-loop mechanisms shown in FIG. 2 may experience errors or malfunctions due to the lack of the input. Additionally, the lack of a needed process value may cause errors in other components in the industrial process control system 100 that are in some way dependent on the operation of the elements 206-216. For example, if the field device 200 is taken out for maintenance purposes, the lack of the process value would impact control connections from the PID element 210 and the ratio control mode element 216 in downstream applications.

Accordingly, the framework 154 is configured to identify all elements within the industrial process control system 100 that use or rely upon one or more process values from a field device 200 prior to taking the field device 200 offline for maintenance or other purpose. For example, the framework 154 in the controller 202 could map out each control connection from the field device 200 and treat each control connection as a separate logic point. In the example illustrated, the process input 206 has two control connections, and two logic points 218 and 220 are illustrated in FIG. 2.

After the logic points 218 and 220 have been identified, the framework 154 identifies and evaluates the elements 206-216 in the logic points 218 and 220 to determine the status of the control connection. For example, while the field device 200 is offline, the elements 206-216 may be provided a manual value, which is a safe, default, and/or manually simulated value, in place of the actual live process value from the field device 200. Using this manual value in place of the process value, the elements 206-216 may be able to experience normal operation while the process value from the field device 200 is unavailable. Thus, the framework 154 in the controller 202 evaluates the elements 206-216 to determine whether the elements 206-216 can safely use the manual value. For example, the controller 202 may evaluate whether the elements 206-216 can receive the manual value and test or simulate whether element operation would be normal or within acceptable tolerances.

In another example, while the field device 200 is offline, the elements 206-216 may need to operate in a "safe mode." In the safe mode, the elements are 206-216 provided with a safe or user configured value. This user configured value is not necessarily in place of the process value from the field device 200. For example, the elements 206-216 may receive and perform calculations on the process value from the field device 200. When placed in the safe mode, the elements 206-216 may operate in the "safe" mode of operation without receiving the user defined value. Thus, the controller 202 may determine whether the elements 206-216 can properly operate in this safe mode.

The framework 154 in the controller 202 then applies a logic expression or algorithm using the results of the evaluation of the individual elements 206-216 to determine the aggregate control connection status of the field device 200. The aggregate control connection status is an expression for the overall status of the connections of the field device 200. For example, the aggregate control connection status may be a binary expression for whether the field device 200 is available to be taken offline for maintenance.

The base algorithm in the framework 154 may determine whether at least one of the elements in each of the logic points can operate in a manual or safe mode (such as by properly operating without the supplied live process value). For example, the logic point 218 may be considered as "safe" for maintenance if the individual elements have the following safe values: process input 206 evaluated as "manual" OR data acquisition element 208 evaluated as "manual" OR PID element 210 evaluated as "manual" OR process output 212 evaluated as "manual." In this case, a manual value could be used for any of the elements 206-212 of the logic point 218. Similarly, the logic point 220 may be considered as "safe" for maintenance if the process input 206 is evaluated as "manual" OR the ratio control mode element 216 is evaluated as "manual." The base algorithm performs a logical "AND" of the values of each logic point to calculate the aggregate control connection status.

In various embodiments, the logic expression or algorithm for determining the aggregate control connection status of a field device can be modified by an operator. For example, a user may choose to override or ignore the evaluation result of an individual element or logic point. As another example, the logic expression or algorithm may be modified to allow an element to be placed into a substitute mode where the value provided to the element is controlled by a substitute program. Any logic expression or algorithm can be used for determining the aggregate control connection status of a field device. Any combination of evaluation results may be factored into the logic expression or algorithm used, and these combinations may be modified on a case-by-case basis.

The aggregate control connection status of a field device may be calculated in any suitable manner, such as continuously, periodically, or on demand. For example, the aggregate control connection status may be periodically calculated and/or recorded according to a predefined schedule. This aggregate control connection status, together with the individual control connections, may be displayed to an operator on a human machine interface (HMI). In another example, an operator may request an aggregate control connection status calculation before taking a field device offline for maintenance. In either example, the calculation may be performed using a background process (e.g., a process that runs in the background) so as not to disturb ongoing system operation. Thereafter, the aggregate control connection status information is made available to the user on an appropriate HMI for the user to easily identify all control connections related to a field device. This information helps the user to ensure the proper state of all connections before deciding whether a field device is to be taken out for maintenance.

Once the aggregate control connection status has been determined, the process control system 100 can communicate this status to an operator in any suitable manner. For example, the status could be displayed on operator stations 116, 124, 132, 140, or the status could be communicated to the field device 200 for field personnel reference. For example, the status may be sent to a user device via an email message, short messaging service (SMS) text message, etc. In particular embodiments, if the field device 200 supports HART field communications, the aggregate control connection status can be communicated to the field device 200 by sending a HART command to the device (using HART I/O channels). The field device 200 may further announce the status to the user, such as by making a sound or beep, flashing a light, or displaying a message or indication on a local display. The field device 200 may also store the value of the aggregate control connection status, which can be sent to mobile devices and other units in the vicinity of the field device 200 by wired and/or wireless communication.

Although FIG. 2 illustrates one example of a field device 200 in an industrial process control system, various changes may be made to FIG. 2. For example, the framework 154 may calculate the aggregate control connection status of any number of field devices. Also, any number of control connections and logic points may be associated with a given field device. Further, the framework 154 may be present at any network level in the process control system 100, and the framework 154 may be distributed across multiple devices (possibly in multiple levels) within the process control system 100. For instance, the logic expression or algorithm may be stored, generated, modified, and/or run by any number of different controllers or operator stations within the process control system 100.

Figure 3:
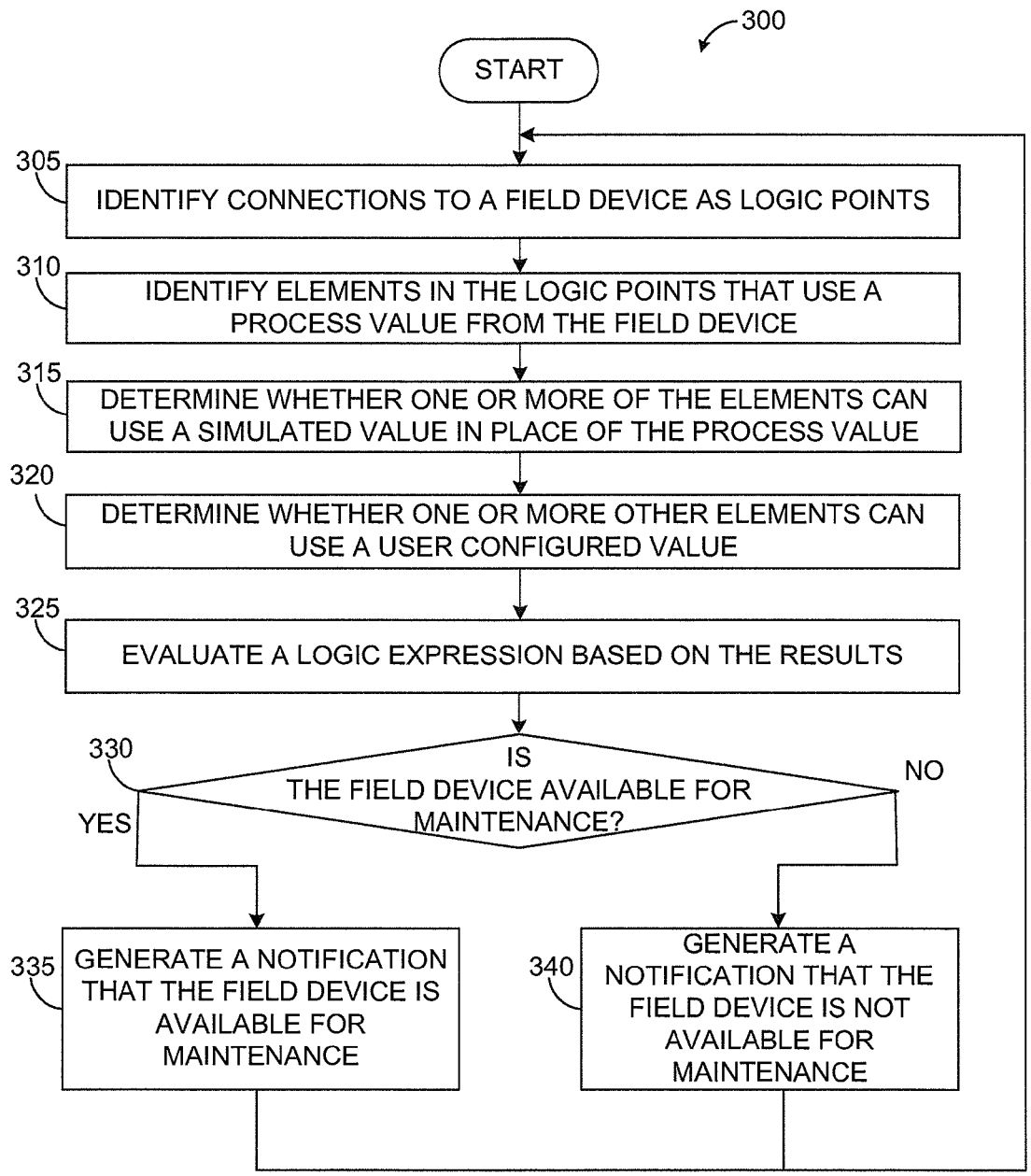
FIG. 3 illustrates an example process for determining an aggregate control connection status of a field device in a process control system according to this disclosure.

FIG. 3 illustrates an example process 300 for determining an aggregate control connection status of a field device in a process control system according to this disclosure. In some embodiments, the process 300 may be performed by one or more components in the process control system 100, such as by the framework 154 in the controller 202. The process 300 could be performed continuously, periodically, or on demand.

As shown in FIG. 3, the process 300 includes identifying connections to a field device as logic points at step 305. This could include, for example, the framework 154 identifying all control connections from the field device 200 that are present in the process control system 100. Elements in the logic points that depend on or otherwise use a process value from a field device are identified at step 310. This could include, for example, the controller identifying elements 206-212 in logic point 218 and elements 206, 214, and 216 in logic point 220. These elements can be identified since their outputs depend, directly or indirectly, on the output of the field device 200.

A determination is made whether one or more of the elements can use a manual value in place of the process value at step 315. This could include, for example, the framework 154 determining whether one or more of the elements 206-216 can operate in a manual mode when the live process value from the field device 200 is not available. This could also include, for example, the framework 154 determining whether one or more of the elements 206-216 can receive and properly use a manually simulated value.

A determination is made whether one or more other elements in the plurality can use a user configured value at step 320. This could include, for example, the framework 154 determining whether elements that use but are not necessarily dependent on the process value can be placed in a safe mode or use a "safe" or a user configured value to operate in the safe mode.

A logic expression is evaluated based on the results at step 325. This could include, for example, the framework 154 applying an algorithm based on the results of the evaluation of one or more of the elements 206-216 to calculate an aggregate control connection status. The aggregate control connection status indicates whether the field device 200 can be removed from operation. A determination is made whether the field device is available for maintenance at step 330. This could include, for example, the controller 202 determining whether the calculated aggregate control connection status is "TRUE" (the field device 200 is available for maintenance) or "FALSE" (the field device 200 is not available for maintenance).

If the field device is determined to be available for maintenance, a notification that the field device is available for maintenance is generated at step 335. This could include, for example, a message, sound, or light displayed on or in proximity to the field device 200 or on an operator station. If the field device is determined not to be available for maintenance, a notification that the field device is not available for maintenance is generated at step 340. This could include, for example, a different message, sound, or light displayed on or in proximity to the field device 200 or on an operator station.

Figure 4:
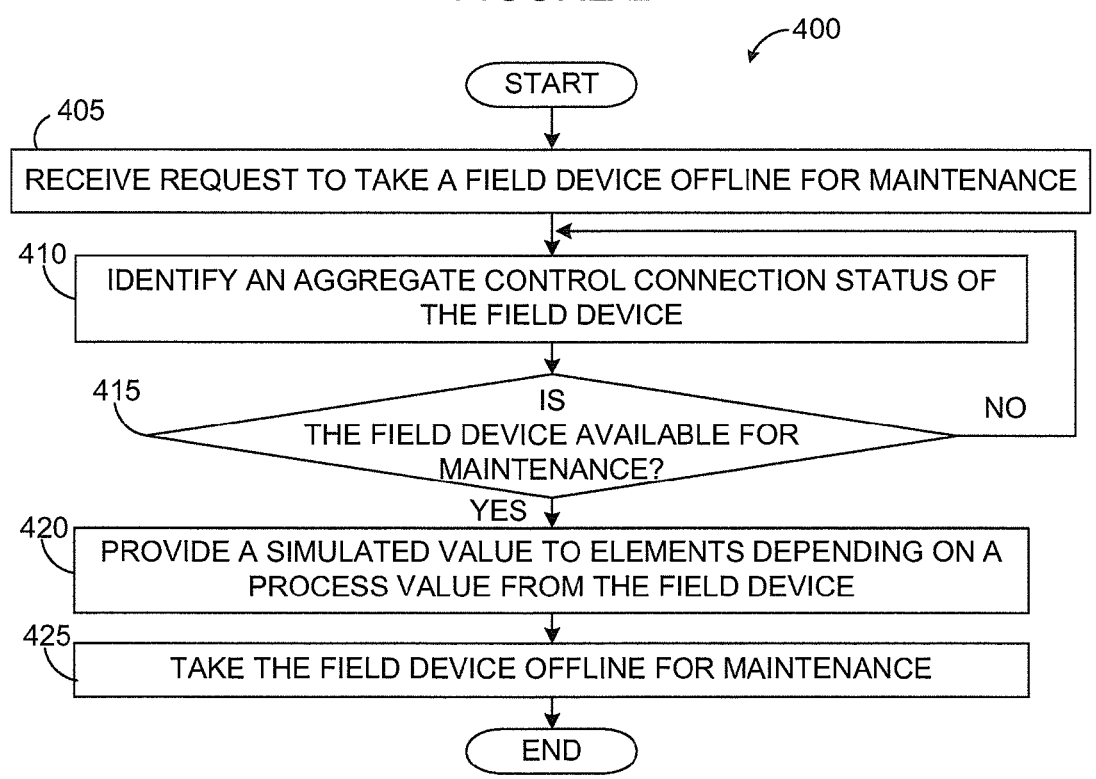
FIG. 4 illustrates an example process for determining whether a field device can be taken offline for maintenance in a process control system according to this disclosure.

FIG. 4 illustrates an example process 400 for determining whether a field device can be taken offline for maintenance in a process control system according to this disclosure. In some embodiments, the process 400 may be performed by one or more components in the process control system 100, such as by the framework 154 in the controller 202.

As shown in FIG. 4, the process 400 includes receiving a request to take a field device offline for maintenance at step 405. This could include, for example, the framework 154 receiving a maintenance request from an operator or maintenance engineer requesting maintenance of the field device 200. An aggregate control connection status of the field device is identified at step 410. This could include, for example, using the process 300 to determine the aggregate control connection status of the field device 200.

A determination is made whether the field device is available for maintenance at step 415. This could include, for example, the framework 154 determining whether the field device 200 is available for maintenance based on the aggregate control connection status of the field device 200. If the field device is determined not to be available for maintenance, the process 400 may return to step 410 to continue to calculate and monitor the aggregate control connection status.

If the field device is determined to be available for maintenance, a manually simulated value is provided to elements depending on or otherwise using a process value from the field device at step 420. This could include, for example, the framework 154 placing the elements 206-216 in a manual mode, where the process value from the field device 200 is not received. The field device is taken offline for maintenance at step 425. This could include, for example, a control application running on the controller 202 disconnecting the control connections of the field device 200 so that a maintenance engineer can operate on the field device 200 without harming other operations in the process control system 100.

Although FIGS. 3 and 4 illustrate examples of processes for determining an aggregate control connection status of a field device in an industrial process control system and determining whether a field device can be taken offline for maintenance in an industrial process control system, respectively, various changes could be made to FIGS. 3 and 4. For example, while shown as a series of steps, various steps in each figure could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    identifying a plurality of connections to a field device in a process control system as logic points;
    identifying, for each logic point, one or more elements that use a process value from the field device;
    identifying an aggregate control connection status of the field device by (i) determining whether at least one of the one or more elements of each logic point is able to use a manual value in place of the process value, (ii) determining whether at least one other of the one or more elements of each logic point is able to use a user configured value, and (iii) evaluating a logic expression based on results of the determining in (i) and (ii), the logic expression comprising a logical "AND" of the results of the determining in (i) and (ii) for each logic point;
    determining whether the field device is available to be taken offline based on the aggregate control connection status; and
    generating a notification based on the determination of whether the field device is available to be taken offline.

2. The method of claim 1, further comprising:
    providing a manually simulated value to the elements in place of the process value when the field device is taken offline.

3. The method of claim 1, further comprising:
    modifying the logic expression.

4. The method of claim 3, wherein the logic expression is configured to ignore at least one result of whether one or more of the elements are able to use the manual value.

5. The method of claim 1, further comprising:
    sending the notification as at least one of a message to a human machine interface, an email message, or a short messaging service (SMS) text message.

6. The method of claim 1, wherein the notification is displayed on the field device.

7. The method of claim 1, wherein identifying the aggregate control connection status of the field device comprises at least one of:
    identifying the aggregate control connection status of the field device in response to a user request;
    identifying the aggregate control connection status of the field device using a background process; or
    identifying the aggregate control connection status of the field device according to a schedule.

8. An apparatus comprising:
    at least one memory configured to store information identifying a plurality of elements in a process control system that uses a process value from a field device; and
    at least one processing device configured to:
        identify a plurality of connections to the field device as logic points;
        identify, for each logic point, one or more of the plurality of elements;
        identify an aggregate control connection status of the field device by (i) determining whether at least one of the one or more elements of each logic point is able to use a manual value in place of the process value, (ii) determining whether at least one other of the one or more elements of each logic point is able to use a user configured value, and (iii) evaluating a logic expression based on results of the determining in (i) and (ii)), the logic expression comprising a logical "AND" of the results of the determining in (i) and (ii) for each logic point;
        determine whether the field device is available to be taken offline based on the aggregate control connection status; and
        generate a notification based on the determination of whether the field device is available to be taken offline.

9. The apparatus of claim 8, wherein the at least one processing device is further configured to provide a manually simulated value to the elements in place of the process value when the field device is taken offline.

10. The apparatus of claim 8, wherein the at least one processing device is further configured to modify the logic expression.

11. The apparatus of claim 10, wherein the logic expression is configured to ignore at least one result of whether one or more of the elements are able to use the manual value.

12. The apparatus of claim 8, wherein the at least one processing device is further configured to:
    send the notification as at least one of a message to a human machine interface, an email message, or a short messaging service (SMS) text message.

13. The apparatus of claim 8, wherein the at least one processing device is further configured to at least one of:
    identify the aggregate control connection status of the field device in response to a user request;
    identify the aggregate control connection status of the field device using a background process; or
    identify the aggregate control connection status of the field device according to a schedule.

14. A non-transitory computer readable medium embodying a computer program, the computer program comprising computer readable program code for:
    identifying a plurality of connections to a field device in a process control system as logic points;
    identifying, for each logic point, one or more elements that use a process value from the field device;
    identifying an aggregate control connection status of the field device by (i) determining whether at least one of the one or more elements of each logic point is able to use a manual value in place of the process value, (ii) determining whether at least one other of the one or more elements of each logic point is able to use a user configured value, and (iii) evaluating a logic expression based on results of the determining in (i) and (ii), the logic expression comprising a logical "AND" of the results of the determining in (i) and (ii) for each logic point;

determining whether the field device is available to be taken offline based on the aggregate control connection status; and generating a notification based on the determination of whether the field device is available to be taken offline.

15. The computer readable medium of claim 14, wherein the computer program further comprises computer readable program code for providing a manually simulated value to the elements in place of the process value when the field device is taken offline.

16. The computer readable medium of claim 14, wherein the computer program further comprises computer readable program code for modifying the logic expression, wherein the logic expression is configured to ignore at least one result of whether one or more of the elements are able to use the manual value.

17. The computer readable medium of claim 14, wherein the computer program further comprises computer readable program code for:

sending the notification as at least one of a message to a human machine interface, an email message, or a short messaging service (SMS) text message.

18. The computer readable medium of claim 14, wherein the computer program further comprises computer readable program code for:

displaying the notification on the field device.

19. The computer readable medium of claim 14, wherein the computer readable program code for identifying the aggregate control connection status of the field device comprises at least one of:

computer readable program code for identifying the aggregate control connection status of the field device in response to a user request;

computer readable program code for identifying the aggregate control connection status of the field device using a background process; or computer readable program code for identifying the aggregate control connection status of the field device according to a schedule.

20. The apparatus of claim 8, wherein the at least one processing device is further configured to display the notification on the field device.

* * * * *